(12) United States Patent
Tien

(10) Patent No.: US 8,047,441 B2
(45) Date of Patent: Nov. 1, 2011

(54) BARCODE SCANNER CAPABLE OF SWITCHING READING RESOLUTION OF SCANNING

(75) Inventor: Kai-Yuan Tien, Taipei (TW)

(73) Assignee: Riotec Co., Ltd., Taipei (TW)

( * ) Notice: Subject to any disclaimer, the term of this patent is extended or adjusted under 35 U.S.C. 154(b) by 193 days.

(21) Appl. No.: 12/582,396

(22) Filed: Oct. 20, 2009

(65) Prior Publication Data

US 2011/0089242 A1    Apr. 21, 2011

(30) Foreign Application Priority Data

Sep. 21, 2009   (TW) ............................... 98217408 U

(51) Int. Cl.
  *G06K 7/10*  (2006.01)
(52) U.S. Cl. .......... 235/462.43; 235/462.01; 235/462.14; 235/462.15; 235/462.2; 235/462.45; 235/462.49; 235/472.01; 235/472.03
(58) Field of Classification Search ............ 235/462.01–462.49, 472.01–472.03
See application file for complete search history.

(56) References Cited

U.S. PATENT DOCUMENTS

| 5,659,167 | A  | * | 8/1997 | Wang et al. | ............... | 235/472.01 |
| 5,686,960 | A  | * | 11/1997 | Sussman et al. | ............ | 348/218.1 |
| 6,424,433 | B1 | * | 7/2002 | Miyauchi et al. | ............. | 358/471 |
| 2008/0149723 | A1 | * | 6/2008 | Zhu et al. | ................. | 235/462.11 |

* cited by examiner

*Primary Examiner* — Thien M. Le
*Assistant Examiner* — Tuyen K Vo
(74) *Attorney, Agent, or Firm* — Chun-Ming Shih; HDLS IPR Services

(57) ABSTRACT

A barcode scanner capable of switching the reading resolution of scanning can be used for scanning a barcode with high resolution or low resolution, including a shell body, a scan module and a switchable magnifying module. The shell body has an opening. The scan module arranged in the shell body has a lighting unit emitting an illuminating light onto the barcode through the opening and a sensing unit sensing a barcode image formed from a reflection of the barcode illuminated by the illuminating light passing through the opening. The switchable magnifying module has a magnifier for magnifying the barcode image and a switch unit for switching the position of the magnifier relative to the sensing unit. The switch unit can move the magnifier between an off-axial position, which is not between the sensing unit and the barcode, and an on-axial position, which is between the sensing unit and the barcode.

6 Claims, 5 Drawing Sheets

BARCODE SCANNER CAPABLE OF SWITCHING READING RESOLUTION OF SCANNING

BACKGROUND OF THE INVENTION

1. Field of the Invention

The present invention in general relates to a barcode scanner, in particular, to a barcode scanner capable of switching reading resolution of scanning.

2. Description of Prior Art

Barcode scanner is a sensing component matched with specific optical assembly for scanning a barcode to obtain its corresponding information. In general, a barcode scanner has a resolution upper-limit for the barcode to be scanned. During scanning, only the barcode with a resolution lower than the upper-limit can be scanned by the scanner.

High resolution has become a trend for a barcode, because it can reduce the barcode volume and save the material cost. However, the resolution of the optical lens in a barcode scanner is inversely proportional to the depth of field of the optical lens. Therefore, in a barcode scanner capable of scanning a barcode with high resolution (<4 mil), its depth of field is shorter relatively. This means that it can effectively scan the barcode only when the user puts the barcode in front of the barcode scanner within a small range or a specifically back and forth distance. On the contrary, in a barcode scanner capable of scanning a barcode with low resolution (>4 mil), its depth of field is longer relatively so, during use, it is unnecessary in some degree to consider the distance between the bar code and the barcode scanner, thereby effectively enhancing the scanning efficiency.

Therefore, in order to solve aforementioned drawbacks, company or store sometimes has to prepare two barcode scanners respectively capable of scanning the barcodes with different resolutions. The barcode scanner with low resolution is used for scanning the barcode with low resolution, while the barcode scanner with high resolution is used for scanning the barcode with high resolution. Thereby, the overall scanning efficiency is enhanced.

However, preparing two kinds of barcode scanners respectively for scanning the barcodes with different resolutions can cause company or store to pay more money to purchase additional devices, especially for large retail store, like mall, where a large amount of barcode scanners are needed. Besides, the cost of a barcode scanner with high resolution is much higher than that of a barcode scanner with low resolution, which can cost a lot of operational fee, especially for large company or store.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve aforementioned problems, the invention is mainly to provide a barcode scanner capable of switching the reading resolution of scanning can be used for scanning a barcode with high resolution or low resolution.

Secondly, the invention is to provide a barcode scanner capable of switching the reading resolution of scanning is used for scanning a barcode with high resolution or low resolution, including a shell body, a scan module and a switchable magnifying module. The shell body has an opening. The scan module arranged in the shell body has a lighting unit emitting an illuminating light onto the barcode through the opening and a sensing unit sensing a barcode image formed from a reflection of the barcode illuminated by the illuminating light passing through the opening. The switchable magnifying module has a magnifier for magnifying the barcode image and a switch unit for switching the position of the magnifier relative to the sensing unit. The switch unit can bring along the magnifier to be switched between an off-axial position, which is not between the sensing unit and the barcode, and an on-axial position, which is between the sensing unit and the barcode.

When the magnifier is brought along and positioned at the on-axial position by the switch unit, a magnified image is generated by the magnifier, because the barcode with high resolution is within its focus, whereby the scanner of the invention can scan a barcode with high resolution. In this case, the resolution of the barcode is equivalently lowered down to a resolution range acceptable by the sensing unit, such that the magnified image can be clearly sensed by the sensing unit via the magnifier, and the relative information possessed by the barcode with high resolution can be thereby read.

BRIEF DESCRIPTION OF DRAWING

The features of the invention believed to be novel are set forth with particularity in the appended claims. The invention itself, however, may be best understood by reference to the following detailed description, which describes a number of embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of embodiments, not used to limit its executing scope. Any equivalent variation and modification made according to appended claims is all covered by the claims claimed by the present invention.

Figure 1:
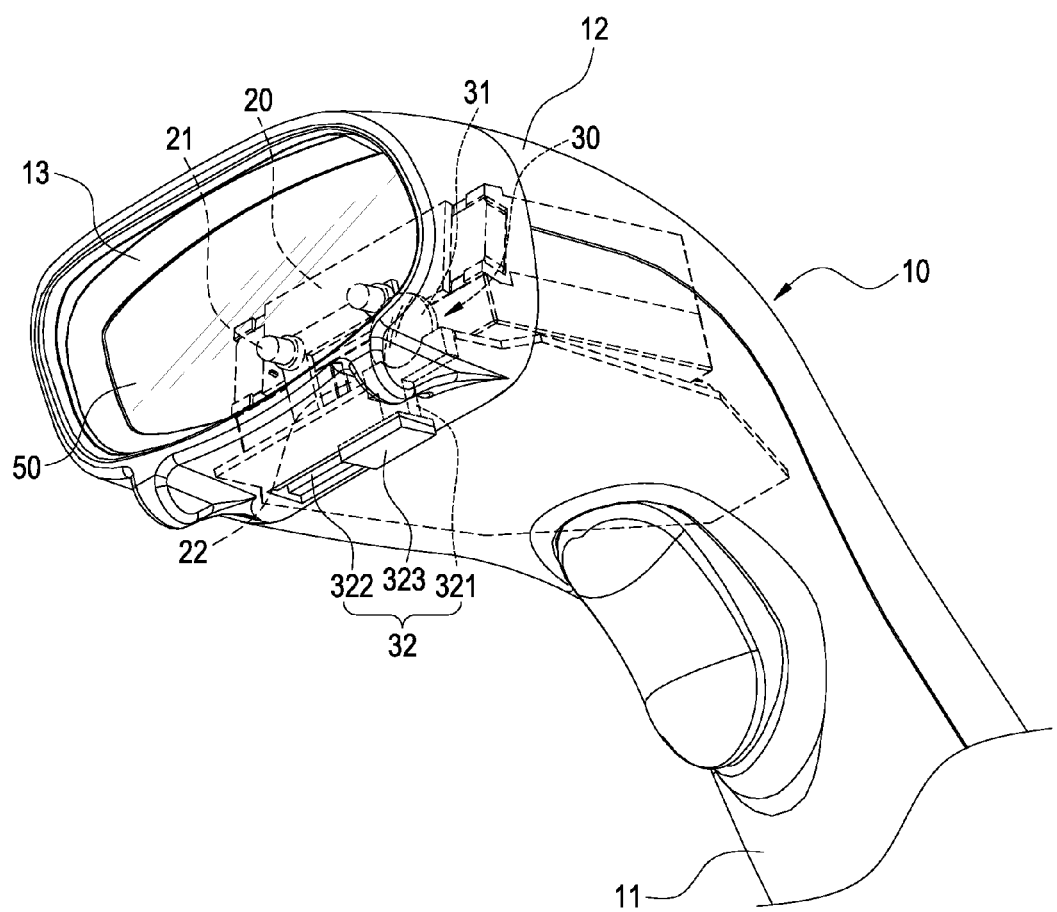
FIG. 1 is an illustration of a barcode scanner capable of switching the reading resolution of scanning according to a first preferable embodiment of the present invention.

FIG. 1 shows a barcode scanner capable of switching the reading resolution of scanning according to a first preferable embodiment of the invention. The barcode to be scanned (not shown in the figures) can be an ordinary barcode with low resolution (>4 mil) or high resolution (<4 mil). Moreover, not limited to one-dimensional barcode, the barcode can also be two-dimensional. The barcode scanner mainly includes a shell body 10, a scan module 20 and a switchable magnifying module 30.

The shell body 10, which is a shell body of portable barcode scanner, has a grip portion 11 for holding by hand and a scan portion 12 extended forwardly from the upper edge of the grip portion 11 with an opening 13 arranged at the front thereof. It should be noted that the shell body 10 of the embodiment is exemplified by a shell body of portable barcode scanner, but a shell body of fixed barcode scanner or data collector can also be adopted during real practice.

Figure 3:
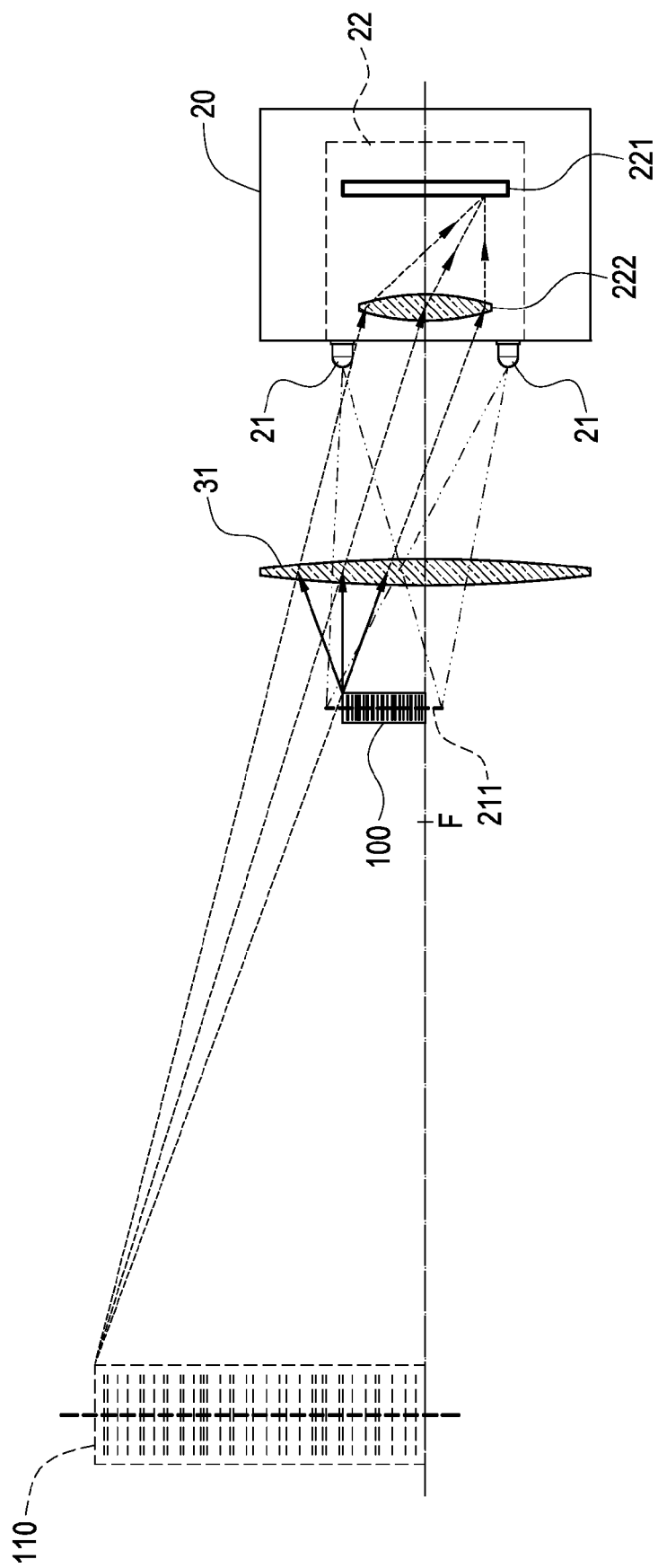
FIG. 3 is an illustration of light route of the barcode scanner capable of switch the reading resolution of scanning according to the present invention.

The scan module 20 is arranged in the scan portion 12 of the shell body 10 and has a lighting unit 21 emitting illuminating light onto the barcode via the opening 13 and a sensing unit 22 sensing a barcode image formed by the reflection of the barcode illuminated by the light via the opening 13. In more detailed, as shown in FIG. 3, the sensing unit 22 includes at least one sensing component 221 for converting the outside image into electric signal and at least one optical lens 222 for imaging the outside image onto the sensing component 221. The sensing component 221 can be a sensing component of CMOS or CCD.

As shown in FIG. 1, the switchable magnifying module 30 is substantially arranged in the shell body 10 has a magnifier for magnifying the barcode image and a switch unit 32 for switching the position of the magnifier 31 relative to the sensing unit 22.

The magnifier 31 is positioned in the scan portion 12 of the shell body 10, substantially at the front of the sensing unit 22. In more specifically, the magnifier 31 can be a convex lens. The switch unit 32 includes a support portion 321 connecting the magnifier 31, a glide trough 322 formed at the shell body for the support portion 321 extending through the shell body 10 and an operational portion 323 connecting the support portion 321 and positioned outside the shell body 10. Moving the operational portion 323 by finger can bring along the support portion 321 to move the position of the magnifier 31.

In addition, the barcode scanner of the invention further includes a transparent piece 50 arranged at the opening 13, through the transparent piece 50 light can pass, and the transparent piece 50 is also used for sealing both the scan 20 and the switchable magnifying module 30 within the shell body 10.

Figure 2:
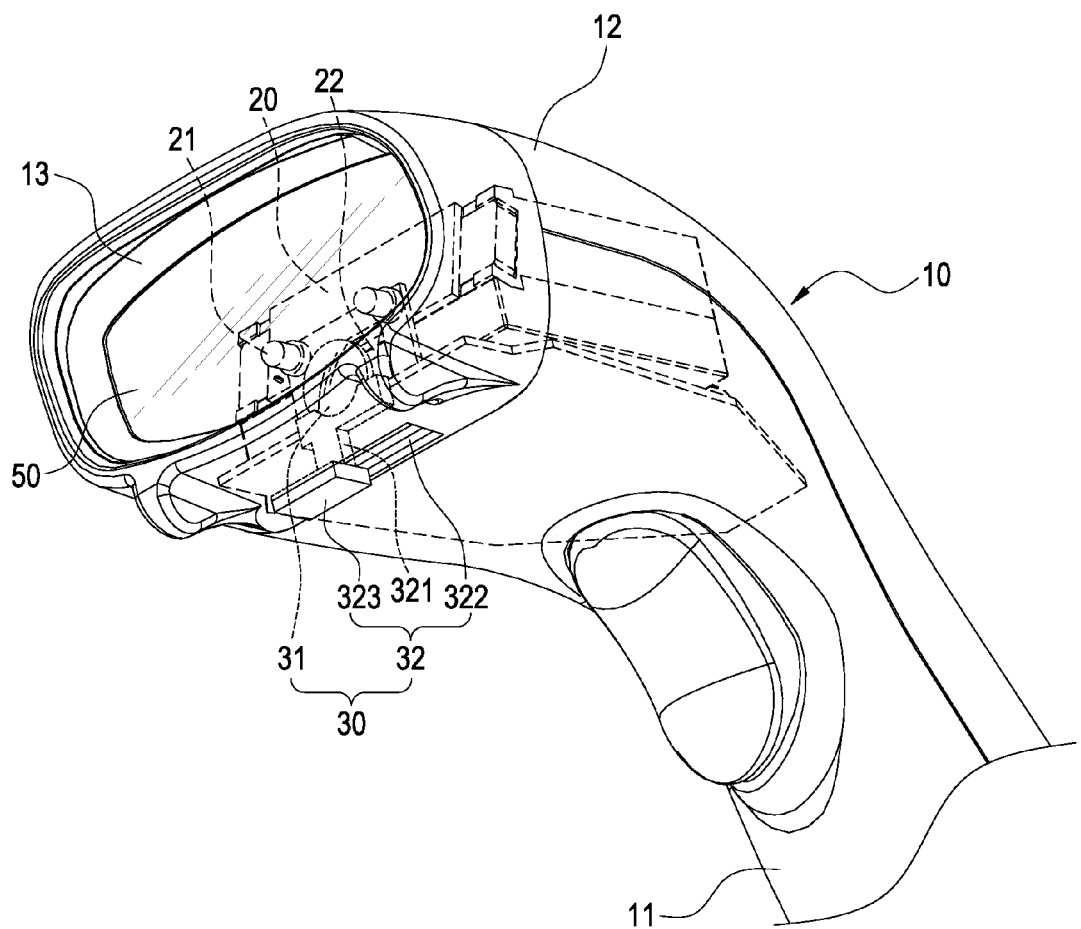
FIG. 2 is an operational illustration of the barcode scanner capable of switching the reading resolution of scanning in FIG. 1.

As shown in FIG. 1 and FIG. 2, brought along by the switch unit 32, the magnifier 31 can be switched between an off-axis position, which is not between the sensing unit 22 and the barcode, as shown in FIG. 1, and an on-axis position, which is between the sensing unit 22 and the barcode, as shown in FIG. 2.

As shown in FIG. 1, when the magnifier 31 is positioned at an off-axial position, the sensing unit 22 can directly sense the image of the barcode to read the relative information possessed by the barcode, but this is only limited to a barcode with low resolution. Under this state, since of the bypass of the magnifier 31, the barcode scanner can have a longer depth of field, so it is convenient for a user to operate effectively and enhance the scan efficiency.

Relatively, as shown in FIG. 2 and FIG. 3, when the magnifier 31 is positioned at an on-axial position, a barcode with high resolution 100 can be scanned, the resolution of which is smaller than 4 mil. Since a magnified image 110 can be generated by the magnifier 31 when the barcode with high resolution 100 is within the focus F of the magnifier 31, the resolution of the barcode with high resolution 100 is equivalently lowered down to a resolution range acceptable by the sensing unit 22. Therefore, the sensing unit 22 can clearly sense the image 110 magnified by the magnifier 31 to read the relative information possessed by the barcode with high resolution 100.

Figure 4:
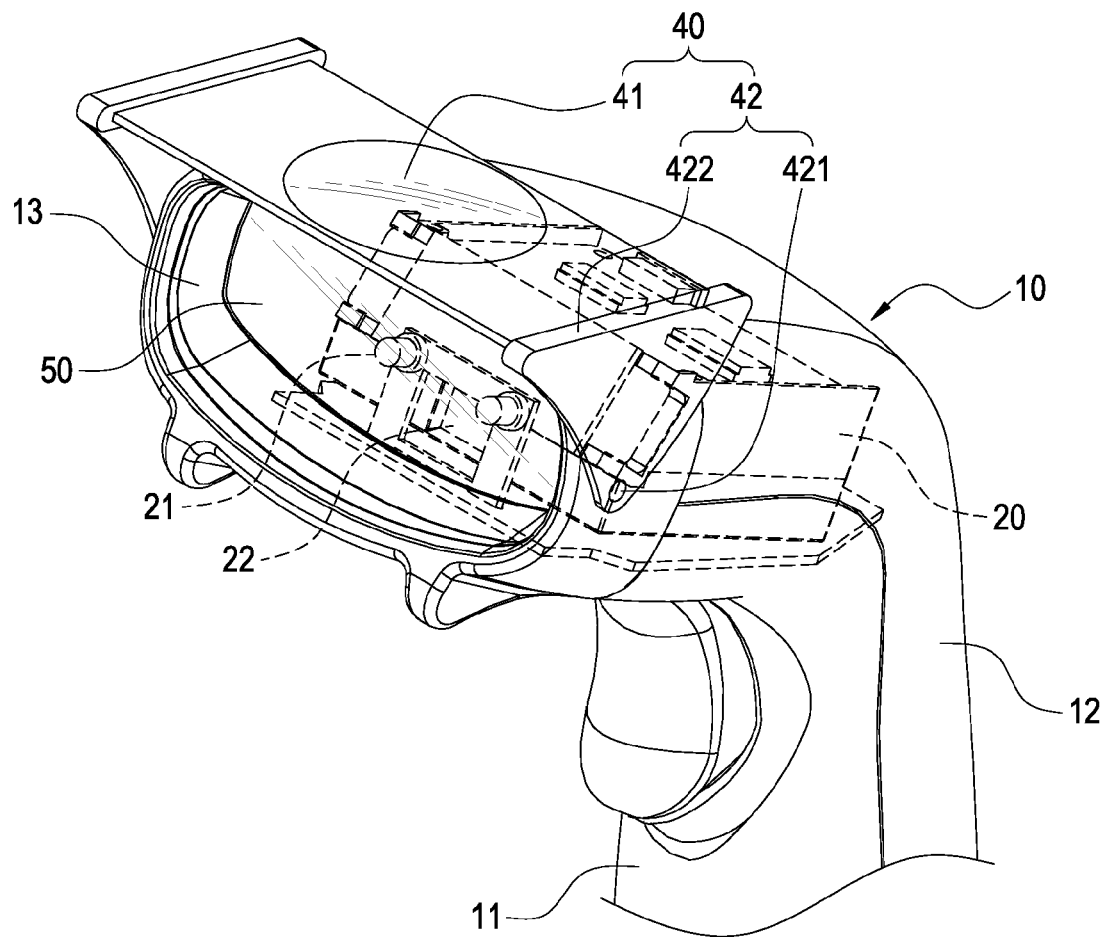
FIG. 4 is an illustration of a barcode scanner capable of switching the reading resolution of scanning according to a second preferable embodiment of the present invention.

FIG. 4 shows a barcode scanner capable of switching the reading resolution of scanning according to a second preferable embodiment of the invention. This embodiment is substantially same as the first one, except that the switchable magnifying unit 40 is substantially arranged outside the shell body 10 and has a magnifier 41 for magnifying the barcode's image and a switch unit 42 for connecting the magnifier 41 and for switching the position of the magnifier 41 relative to the sensing unit 22. In this case, the magnifier 41 is positioned outside the shell body 10. The switch unit 42 includes two pivot portions 421 pivoted to the shell body 40 and a support portion 422 for connecting the pivot portion 421 and for arranging the magnifier 41. It should be noted that the number of the pivot portion 421 is not limited to two, one pivot portion 421 can also be applicable during real practice.

Figure 5:
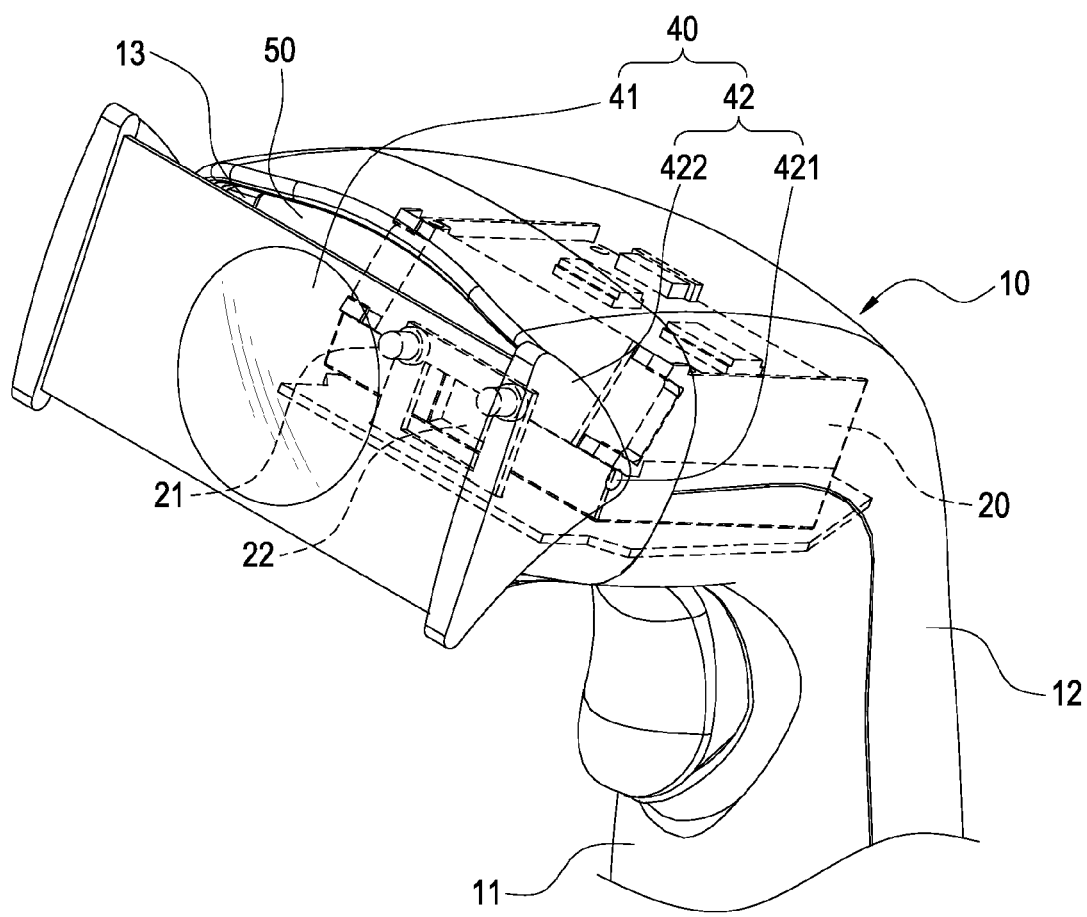
FIG. 5 is an operational illustration of the barcode scanner capable of switching the reading resolution of scanning in FIG. 4.

As shown in FIG. 4 and FIG. 5, user can move the switch unit 42 upwardly and downwardly to bring along the magnifier 41, whereby the magnifier 41 can be switched between an off-axial position, which is not between the sensing unit 22 and the barcode, as shown in FIG. 4, and an on-axial position, which is between the sensing unit 22 and the barcode, as shown in FIG. 5.

However, the aforementioned description is only a number of preferable embodiments according to the present invention, not used to limit the patent scope of the invention, so equivalently structural variations made to the contents of the present invention, for example, description and drawing, are all covered by the claims claimed thereinafter.

What is claimed is:

1. A barcode scanner for switching reading resolution of scanning, including
    a shell body, which has an opening;
    a scan module, which is arranged in the shell body, and which has a lighting unit emitting an illuminating light onto the barcode through the opening and a sensing unit sensing a barcode image formed from a reflection of the barcode illuminated by the illuminating light passing through the opening; and
    a switchable magnifying module, which has a magnifier for magnifying the barcode image and a switch unit for switching the position of the magnifier relative to the sensing unit, the switch unit for bringing along the magnifier to be switched between an off-axial position, which is not between the sensing unit and the barcode, and an on-axial position, which is between the sensing unit and the barcode.

2. The barcode scanner for switching reading resolution of scanning according to claim 1, wherein the magnifier is positioned in the shell body.

3. The barcode scanner for switching reading resolution of scanning according to claim 2, wherein the switch unit includes a support portion connecting the magnifier, a glide trough formed at the shell body and through the glide trough the support portion extending outside the shell body, and an operational portion connecting the support portion and positioned outside the shell body.

4. The barcode scanner for switching reading resolution of scanning according to claim 1, wherein the magnifier is positioned outside the shell body.

5. The barcode scanner for switching reading resolution of scanning according to claim 4, wherein the switch unit includes at least one pivot portion pivoted to the shell body and a support portion connecting the pivot portion and arranged the magnifier.

6. The barcode scanner for switching reading resolution of scanning according to claim 1, wherein the shell body is a shell body of a portable barcode scanner, a fixed barcode scanner or a data collector.

* * * * *